(12) United States Patent
Nishizawa

(10) Patent No.: US 6,537,325 B1
(45) Date of Patent: Mar. 25, 2003

(54) APPARATUS AND METHOD FOR GENERATING A SUMMARIZED TEXT FROM AN ORIGINAL TEXT

(75) Inventor: Shin'ichiro Nishizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/256,190

(22) Filed: Feb. 24, 1999

(30) Foreign Application Priority Data

Mar. 13, 1998 (JP) .......................................... 10-063245

(51) Int. Cl.⁷ .............................................. G06F 17/30
(52) U.S. Cl. .......................................... 715/530; 704/9
(58) Field of Search ..................... 707/530, 9

(56) References Cited

U.S. PATENT DOCUMENTS

| | | | | |
|---|---|---|---|---|
| 5,638,543 A | * | 6/1997 | Pedersen et al. | 704/1 |
| 5,708,825 A | * | 1/1998 | Sotomayor | 707/501.1 |
| 5,838,323 A | * | 11/1998 | Rose et al. | 345/700 |
| 5,924,108 A | * | 7/1999 | Fein et al. | 707/531 |
| 6,353,824 B1 | * | 3/2002 | Boguraev et al. | 704/9 |

FOREIGN PATENT DOCUMENTS

| | | |
|---|---|---|
| JP | 63-298563 | 12/1988 |
| JP | 2-254566 | 10/1990 |
| JP | 3-191475 | 8/1991 |

OTHER PUBLICATIONS

Gerard Salton, "Automatic Text Processing: The Transformation, Analysis, and Retrieval of Information by Computer", Addison–Wesley, 1989, pp. 439–448.*

H.P. Edmundson, "New Methods in Automatic Extracting", Journal of the Association for Computing Machinery, vol. 16, No. 2, Apr. 1969, pp. 264–285.*

Chin–Yew Lin and Eduard Hovy, "Identifying Topics by Position", Proceedings of Fifth Conference on Applied Natural Language Processing, Association of Computational Linguistics, Mar. 21–Apr. 3, 1997.*

* cited by examiner

Primary Examiner—Heather R. Herndon
Assistant Examiner—Adam Queler
(74) Attorney, Agent, or Firm—Staas & Halsey LLP

(57) ABSTRACT

A document comprehension support apparatus includes an original text analysis unit which divides an original text into significance paragraphs, the significance paragraphs being separated from each other at boundaries that are determined based on sums of points rated for individual sentences in the original text, each significance paragraph containing a group of sentences. A summarized text generating unit calculates a sum of significance indexes for each of the individual sentences contained in the significance paragraphs produced by the original text analysis unit, and generates a summarized text from each of the significance paragraphs, the summarized text containing only a predetermined number of sentences selected in order of the calculated sum of significance indexes.

18 Claims, 15 Drawing Sheets

SIGNIFICANCE INDEX TABLE

| NOUN | SIGNIFICANCE INDEX |
|---|---|
| A | 3 |
| B | 6 |
| C | 2 |
| D | 8 |
| E | 2 |
| F | 1 |
| G | 3 |

← SIGNIFICANT NOUNS ARE LISTED HERE

CALCULATION FOR NON-SIGNIFICANT NOUNS (a, b, c) IS EXCLUDED →

| SENTENCE NO. | NOUNS INCLUDED | SUM OF SIGNIFICANCE INDEXES |
|---|---|---|
| SENTENCE#1 | a, b, f, B, h, g, k, a, A | B+A=6+3=9 |
| SENTENCE#2 | B, a, c, E, D | B+E+D=6+2+8=16 |
| SENTENCE#3 | f, D, B, D, f, D | D+B+D=30 |
| ... | ... | ... |

70

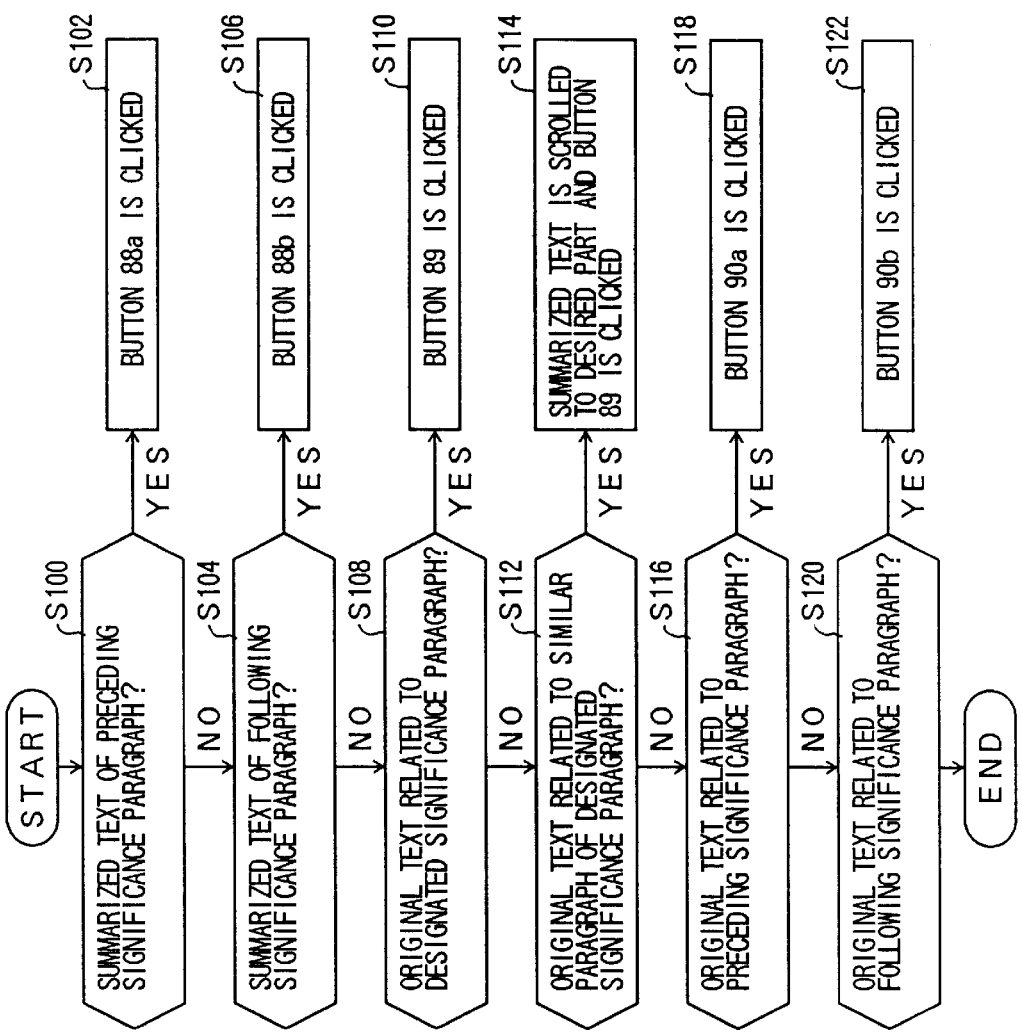

APPARATUS AND METHOD FOR GENERATING A SUMMARIZED TEXT FROM AN ORIGINAL TEXT

BACKGROUND OF THE INVENTION

(1) Field of the Invention

The present invention relates to a document comprehension support apparatus adapted to generate a summarized text from an original text, in which the summarized text is output to help the user easily comprehend the contents of the original text. The present invention relates to a method of generating a summarized text from an original text, which is carried out by a document comprehension support apparatus. Further, the present invention relates to a computer readable medium storing program code instructions which cause a processor of a document comprehension support apparatus to execute a document comprehension support processing.

(2) Description of the Related Art

A computer-based document comprehension support apparatus which functions to generate a summarized text, or topic sentences, from an original text of a document is known. In the known document comprehension support apparatus, the summarized text may be displayed on a display device or stored in a memory device, in order to help the user easily comprehend the contents of the original text.

Japanese Laid-Open Patent Application No. 3-191475 discloses a document comprehension support apparatus in which an original text is divided into paragraphs with their headings. Important sentences are collected from each of the paragraphs by using predetermined sentence extraction rules selected for each heading. A set of the headings and the collected important sentences are generated as a summarized text of the original text.

Japanese Laid-Open Patent Application No. 2-254566 discloses a document comprehension support apparatus in which an original text is divided into processing units. In this apparatus, a sentence structure analysis is carried out using a sentence structure dictionary. By calculating a large amount of statistical indexes, such as a word frequency, and using a large number of sentence extraction rules, a summarized text is generated from the original text.

Japanese Laid-Open Patent Application No. 63-298563 discloses a document comprehension support apparatus. In this apparatus, an original text is divided into summarizing processing units. Before outputting a summarized text, a summarizing range of the original text and a summarizing method for generating a summarized text from each of the processing units must be designated by the user by using an input device.

In the apparatus disclosed in the above publication No. 3-191475, it is difficult to provide an effective, easy-to-use tool for the user when searching for a summarized text of the original text. The summarized text, output by this apparatus, is arranged in the form depending on the form of the original text. The summarized text arranged in such a form is less effective in helping the user comprehend the contents of the original text from the summarized text. Further, the apparatus of this publication is unable to display a relevant part of the original text, corresponding to the summarized text, on the display device when the user desires to review it.

In the apparatus disclosed in the above publication No. 2-254566, it is necessary to incorporate the sentence structure analysis device, the sentence extraction rules, the sentence structure dictionary and others. The apparatus of this publication has to be constructed in a complicated structure with a bulky size. A relative long processing time is needed for the sentence structure analysis and the calculations of the statistical indexes.

In the apparatus disclosed in the above publication No. 63-298563, the designation of a summarizing range and the designation of a summarizing method have to be input by the user. The apparatus of this publication is unable to automatically generate a summarized text from the original text without inputting such designations. It is difficult for the apparatus of this publication to provide an effective, easy-to-use tool for the user in searching for a desired part of not only the summarized text but also the original text.

SUMMARY OF THE INVENTION

An object of the present invention is to provide an improved document comprehension support apparatus and method in which the above-mentioned problems are eliminated.

Another object of the present invention is to provide a document comprehension support apparatus which can be constructed in a simple structure with a small system size, requires only a short processing time to generate a summarized text from an original text, and provides an effective, easy-to-use tool for the user in searching for a desired part of not only the summarized text but also the original text.

Still another object of the present invention is to provide a method of generating a summarized text from an original text, which requires only a short processing time to generate the summarized text from the original text, and provides an effective, easy-to-use tool for the user in searching for a desired part of not only the summarized text but also the original text.

A further object of the present invention is to provide a computer readable medium storing program code for causing a processor to execute a document comprehension support processing, which requires only a short processing time to generate a summarized text from an original text, and provides an effective, easy-to-use tool for the user in searching for a desired part of not only the summarized text but also the original text.

The above-mentioned objects of the present invention are achieved by a document comprehension support apparatus which includes: an original text analysis unit which divides an original text into significance paragraphs, the significance paragraphs being separated from each other at boundaries that are determined based on sums of points rated for individual sentences in the original text, each significance paragraph containing a group of sentences; and a summarized text generating unit which calculates a sum of significance indexes for each of the individual sentences contained in the significance paragraphs produced by the original text analysis unit, and generates a summarized text from each of the significance paragraphs, the summarized text containing only a predetermined number of sentences selected in order of the calculated sum of significance indexes.

The above-mentioned objects of the present invention are achieved by a method of generating a summarized text from an original text, which includes the steps of: dividing an original text into significance paragraphs, the significance paragraphs being separated from each other at boundaries that are determined based on sums of points rated for individual sentences in the original text, each significance paragraph containing a group of sentences; calculating a sum of significance indexes for each of the individual sentences contained in the significance paragraphs; and generating a summarized text from each of the significance paragraphs, the summarized text containing only a predetermined number of sentences selected in order of the calculated sum of significance indexes.

The above-mentioned objects of the present invention are achieved by a computer readable medium storing program code for causing a processor to execute a document comprehension support processing, which includes: a first program code unit which causes the processor to divide an original text into significance paragraphs, the significance paragraphs being separated from each other at boundaries that are determined based on sums of points rated for individual sentences in the original text, each significance paragraph containing a group of sentences; a second program code unit which causes the processor to calculate a sum of significance indexes for each of the individual sentences contained in the significance paragraphs produced by the first program code unit; and a third program code unit which causes the processor to generate a summarized text from each of the significance paragraphs, the summarized text containing only a predetermined number of sentences selected in order of the calculated sum of significance indexes.

It is possible that the document comprehension support apparatus of the present invention be constructed in a simple structure with a small system size. The sentence structure analysis and a large amount of statistical indexes as in the conventional apparatus of the above publications are not required to generate the summarized text from the original text. The apparatus and method according to the present invention requires only a short processing time to generate the summarized text from the original text. It is possible for the apparatus and method of the present invention to provide an effective, easy-to-use tool for the user in searching for a desired part of not only the summarized text but also the original text.

BRIEF DESCRIPTION OF THE DRAWINGS

Other objects, features and advantages of the present invention will become more apparent from the following detailed description when read in conjunction with the accompanying drawings in which:

FIG. 17 is a flowchart for explaining an operational procedure when the user searches for a desired part of the original text in the original text window or a desired part of the summarized text in the summarized text window.

DESCRIPTION OF THE PREFERRED EMBODIMENT

A description will now be given of the preferred embodiment of the present invention with reference to the accompanying drawings.

Figure 1:
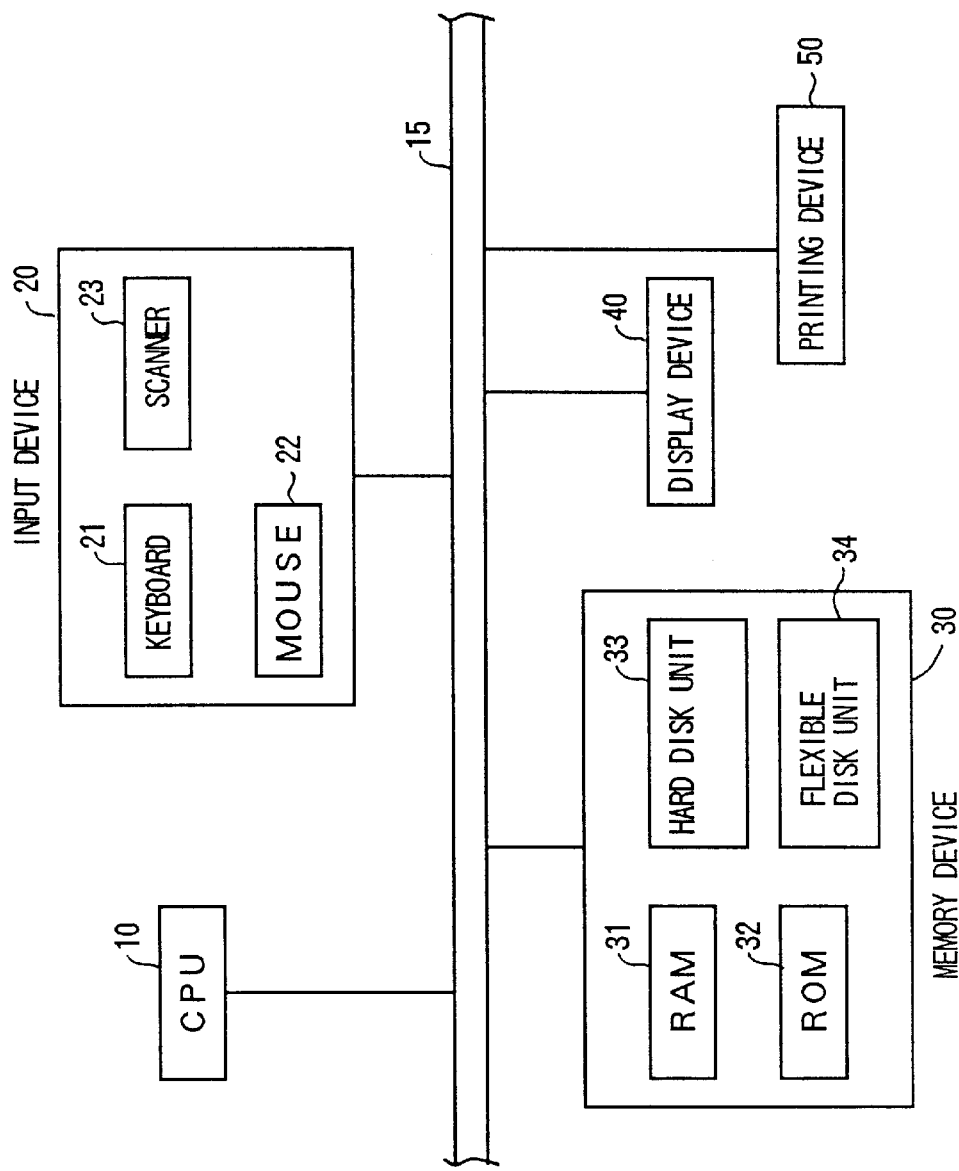
FIG. 1 is a block diagram of a document comprehension support apparatus embodying the present invention.

FIG. 1 shows a document comprehension support apparatus embodying the present invention.

As shown in FIG. 1, the document comprehension support apparatus of the present embodiment includes a central processing unit (CPU) 10 (which is hereinafter called the CPU 10). An input device 20, a memory device 30, a display device 40 and a printing device 50 are connected to the CPU 10 through a bus 15.

In the document comprehension support apparatus of the present embodiment, the input device 20 includes a keyboard 21, a mouse 22, and a scanner 23. The memory device 30 includes a random access memory (RAM) 31, a read-only memory (ROM) 32, a hard disk unit 33, and a flexible disk unit 34. The CPU 10 executes one of various programs in the memory device 30, stores results of execution of the program of concern in the memory device 30, and outputs the results of execution of the program of concern to the display device 40 or the printing device 50. The results of execution of the program of concern may be displayed on the display device 40. Alternatively, the results of execution of the program of concern may be printed out by the printing device 50. In addition to the various programs, several libraries are also stored in the memory device 30.

Figure 2:
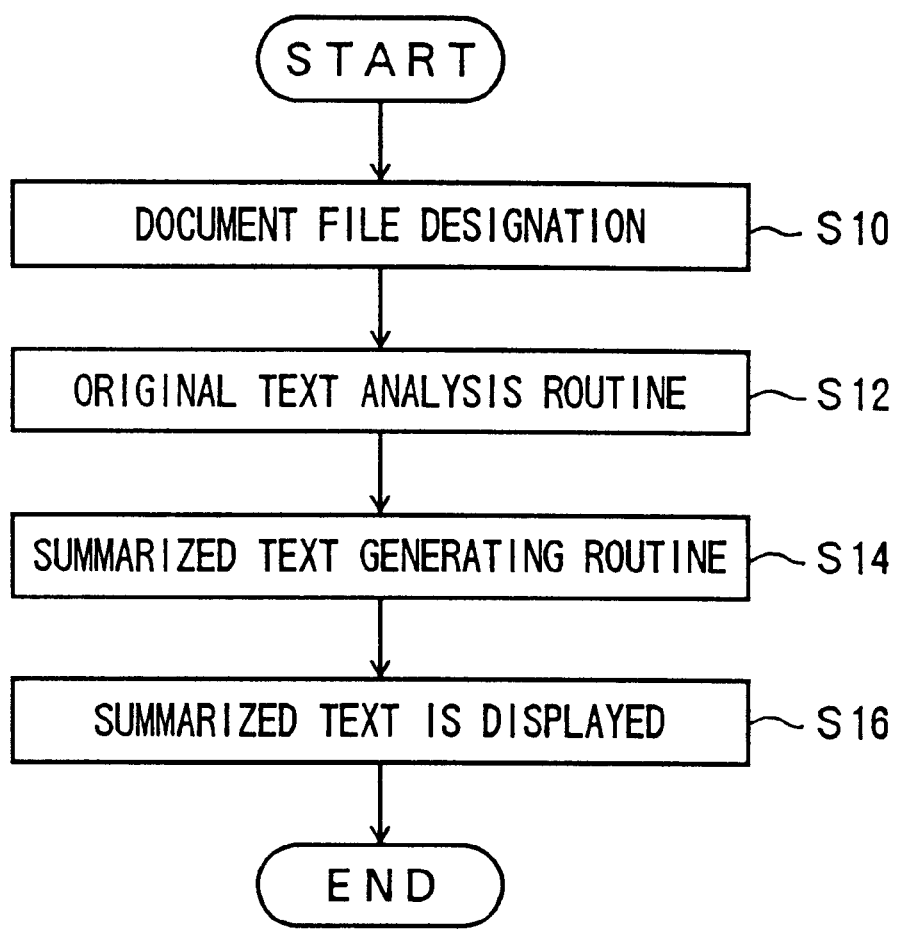
FIG. 2 is a flowchart for explaining a document comprehension support processing executed by the document comprehension support apparatus of FIG. 1.

FIG. 2 shows a document comprehension support processing executed by the document comprehension support apparatus of FIG. 1.

In the document comprehension support apparatus of the present embodiment, program code instructions stored in a computer readable medium causes a processor to execute the document comprehension support processing. The CPU 10 in the present embodiment acts as the processor, and one of the memories 31, 32, 33 and 34 of the memory device 30 constitutes the computer readable medium.

As shown in FIG. 2, at the start of the document comprehension support processing, the CPU 10 at step S10 designates one of document files, stored in the memory device 30, that contains an original text to be processed, by receiving a user's input from the input device 20. When the original text is divided into plural document files and they are stored in the memory device 30, the plural document files are designated at the step S10.

The CPU 10 at step S12 performs an original text analysis routine so that the original text in the designated document file is divided into significance paragraphs, the significance paragraphs being separated from each other at boundaries that are determined based on sums of points rated for individual sentences in the original text, each significance paragraph containing one or a group of sentences.

The CPU 10 at step S14 performs a summarized text generating routine so that a significance index is calculated for each of the individual sentences in the significance paragraphs, and a summarized text is generated from the original text, the summarized text containing only sentences with a largest significance index among the calculated significance indexes.

The CPU 10 at step S16 displays the summarized text on the display device 40 as a guide of the original text for the user.

Figure 3:
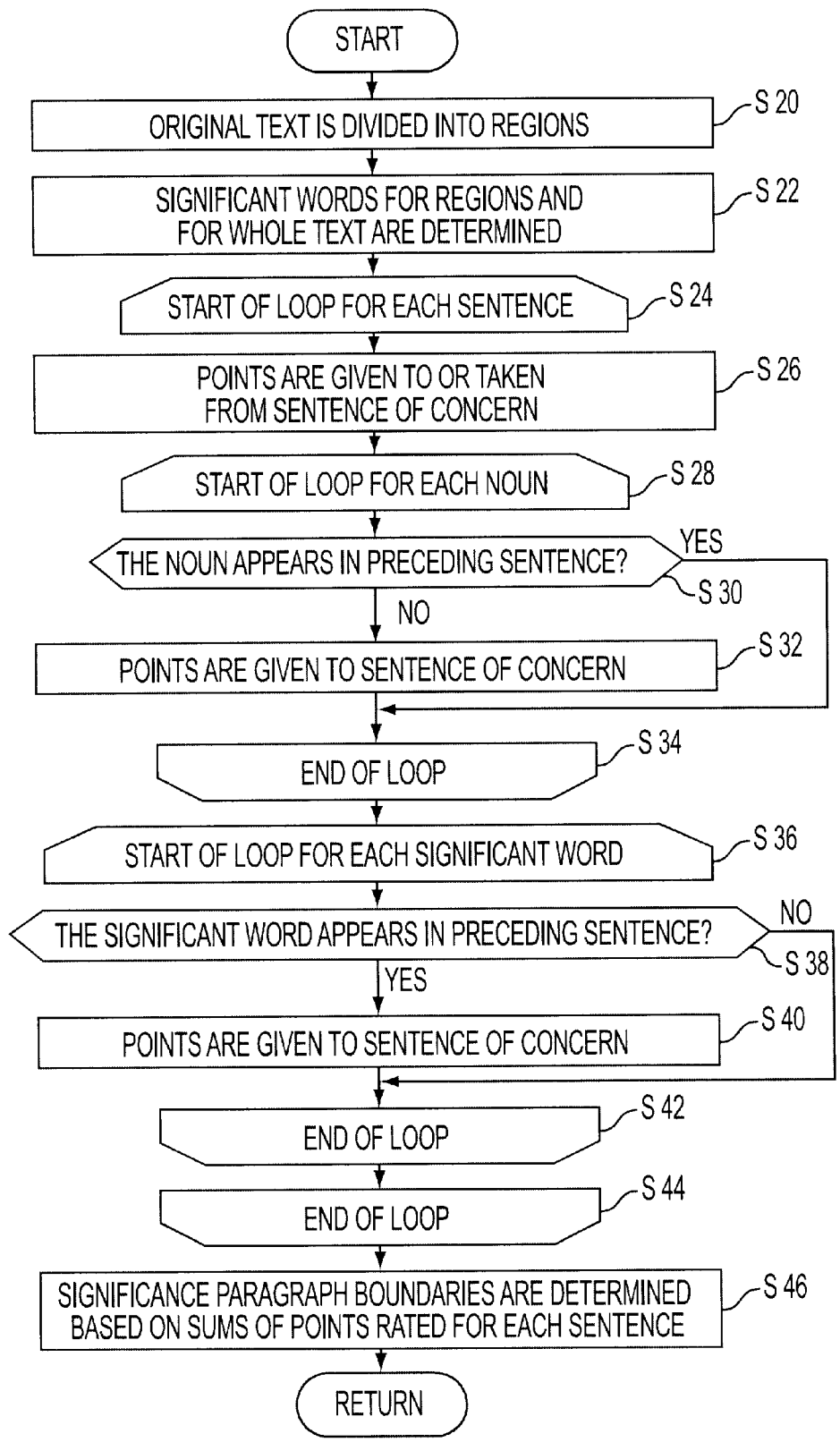
FIG. 3 is a flowchart for explaining an original text analysis routine in the document comprehension support processing of FIG. 2.

FIG. 3 shows an example of the original text analysis routine executed at the step S12 of the document comprehension support processing of FIG. 2.

As shown in FIG. 3, at the start of the original text analysis routine, the CPU 10 at step S20 divides the original text into significance check regions, each of the significance check regions containing a given number of sentences.

The CPU 10 at step S22 determines a set of significant words for each of the significance check regions based on calculations of significance indexes of individual words (or nouns) in the significance check region. Further, the CPU 10 at the step S22 determines significant words for the whole original text by collecting the sets of significant words for all the significance check regions.

In the step S22, the calculation of a significance index of each noun (or each of the individual words) is performed as follows.

Suppose that a first significance factor "tf", which means "term frequency", indicates a ratio of a frequency of occurrence of the noun of concern in the significance check region to a frequency of occurrence of the noun of concern in the whole original text, and a second significance factor "idf", which means "inverted document frequency", indicates a ratio of a total number of the significance check regions in the whole original text to the number of the significance check regions in which the noun of concern appears. The significance index of the noun is represented by a product of the first significance factor "tf" by the second significance factor "idf", that is, the significance index of the noun is determined by the value of "tf·idf".

For each of the individual words contained in the significance check region, the CPU 10 at the step S22 determines the word in the significance check region as being the significant word for the significance check region only when the significance index "tf·idf" of the word exceeds a first threshold value. Otherwise the CPU 10 at the step S22 determines the word as being a non-significant word for the significance check region. In this manner, the CPU 10 produces a set of significant words for each of the significance check regions. By collecting the sets of significant words for all the significance check regions, the CPU 10 determines significant words for the whole original text. That is, the CPU 10 at the step S22 determines the word in the original text as being the significant word for the whole original text only when the significance index "tf·idf" of the word exceeds a second threshold value. Otherwise the CPU 10 at the step S22 determines the word as being a non-significant word for the whole original text.

The CPU 10 at step S24 starts a loop processing in which a rating of points is repeated for each of the individual sentences in the original text.

After the step S24 is performed, the CPU 10 at step S26 performs a rating of points for one of the individual sentences in the original text.

For example, in the step S26, if the beginning of the sentence of concern is preceded by the end of one of plural document files, two points are given (or added) to the sentence of concern. In the present embodiment, when the original text is divided into plural document files, the ends of the plural document files are considered boundaries between the significance paragraphs.

Also, when a sentence preceding the sentence of concern is followed by a title or heading of a section or sub-section in the original text, two points are given (or added) to the sentence of concern. In the present embodiment, the titles or headings of the sections or sub-sections in the original text are considered boundaries between the significance paragraphs.

Also, when the sentence of concern starts with a conjunction or the like that expresses a change of a topic, two points are given (or added) to the sentence. In the present embodiment, conjunctions or the like (for example, "at first" ("hajimeni" in Japanese), "incidentally" ("tokorode" in Japanese), "meanwhile" ("ippoh" in Japanese), etc.) that express a change of a topic in the original text are considered boundaries between the significance paragraphs.

Also, when the sentence of concern starts with a conjunction or the like that expresses a continuation of a topic, two points are taken (or reduced) from the sentence of concern. In the present embodiment, conjunctions or the like (for example, "thus" or "hence" ("konoyohni" in Japanese), "consequently" ("sohnaruto" in Japanese), etc.) that express a continuation of a topic in the original text are considered as being within the significance paragraph (or the non-boundary in the significance paragraph).

After the step S26 is performed, the CPU 10 at step S28 starts a loop processing in which a rating of points for the sentence of concern is repeated with respect to each of the individual words (or nouns) in the sentence.

After the step S28 is performed, the CPU 10 at step S30 determines whether the noun of concern already appears in the preceding sentence. In the present embodiment, the start of the significance check region in which such sentences that include the significant word for the whole original text are contained is considered the boundary between the significant paragraphs. When the result at the step S30 is affirmative, the control of the CPU 10 is transferred to step S34 (which will be described below).

When the result at step S30 is negative, it is determined that the noun of concern does not appear in the preceding sentence. The CPU 10 at step S32 gives one point to the sentence of concern if the noun is only one of the significant words for the whole original text, and gives 1.5 points to the sentence of concern if the noun is both one of the significant words for the whole original text and one of the significant words for the significance check region.

The CPU 10 at step S34 detects that the loop of the step S28 for each of the nouns in the sentence of concern is terminated. Only when the loop for all the nouns in the sentence is not terminated, the control of the CPU 10 is transferred to the step S30 to process the next noun.

After the step S34 is performed, the CPU 10 at step S36 starts a loop processing in which a rating of points for the sentence of concern is repeated with respect to each of the significant words for the whole original which do not appear in the sentence of concern.

After the step S36 is performed, the CPU 10 at step S38 determines whether the significant word of concern already appears in the preceding sentence. In the present embodiment, the end of the significance check region in which such sentences that include the significant word for the whole original text are contained is considered the boundary between the significant paragraphs. When the result at the step S38 is negative, the control of the CPU 10 is transferred to step S42 (which will be described below).

When the result at step S38 is affirmative, it is determined that the significant word of concern appears in the preceding sentence. The CPU 10 at step S40 gives 1.5 points to the sentence of concern if the significant word is also one of the significant words for the significance check region, and gives one point to the sentence of concern if the significant word is not one of the significant words for the significance check region.

The CPU 10 at step S42 detects that the loop of the step S36 for each of the significant words not included in the sentence is terminated. Only when the loop for all the significant words not included in the sentence is not terminated, the control of the CPU 10 is transferred to the step S38 to process the next significant word.

After the step S42 is performed, the CPU 10 at step S44 detects that the loop of the step S24 for each of the sentences in the original text is terminated. Only when the loop for all the sentences in the original text is not terminated, the control of the CPU 10 is transferred to the step S26 to process the next sentence.

After the step S44 is performed, the CPU 10 at step S46 determines the start of the sentence of concern as being the boundary between the significance paragraphs when the sentence has a sum of the points which exceeds a given threshold value, the sum of the points resulting from the above steps S26, S32 and S40. In this manner, the CPU 10 at the step S46 determines the boundaries between the significance paragraphs for the whole original text based on the sums of the points rated for the individual sentences. After the boundaries between the significance paragraphs are determined, the CPU 10 reconstructs the sets of significant words for the significance paragraphs from the sets of significant words for all the significance check regions. Then, the original text analysis routine shown in FIG. 3 ends.

Figure 4:
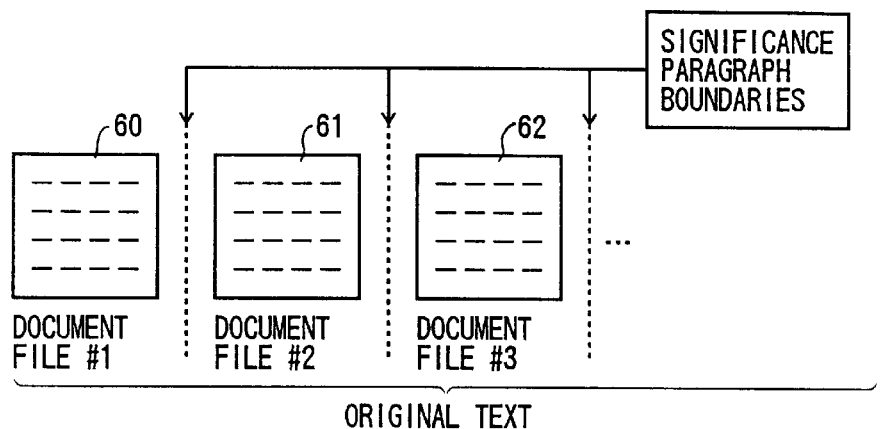
FIG. 4 is a diagram for explaining how the significance paragraph boundaries are determined in the original text analysis routine of FIG. 3.

FIG. 4 is a diagram for explaining how the significance paragraph boundaries are determined in the original text analysis routine of FIG. 3. As shown in FIG. 4, when the original text is divided into plural document files 60, 61, 62, . . . , the ends of the plural document files 60, 61, 62, . . . are considered the boundaries between the significance paragraphs.

Figure 5:
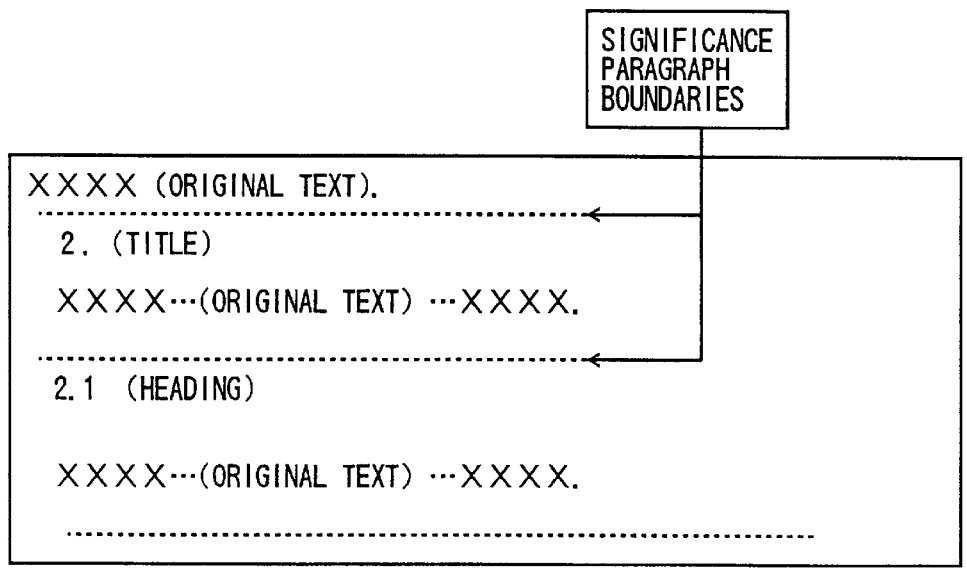
FIG. 5 is a diagram for explaining how the significance paragraph boundaries are determined in the original text analysis routine of FIG. 3.

Also, FIG. 5 is a diagram for explaining how the significance paragraph boundaries are determined in the original text analysis routine of FIG. 3. As shown in FIG. 5, when the end of the sentence of concern is followed by a title or heading of a section or sub-section in the original text, the title or heading of the section or sub-section in the original text is likely to be considered the boundary between the significance paragraphs.

Figure 6:
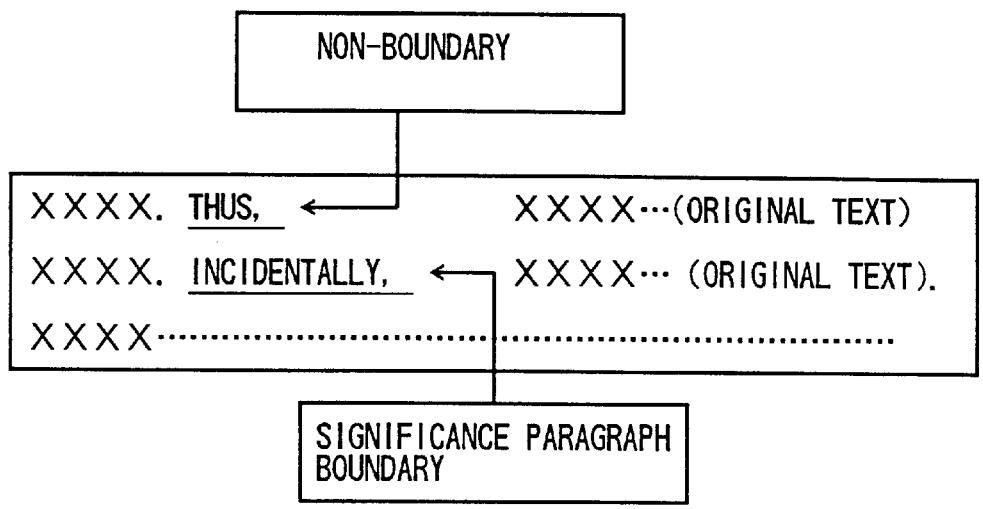
FIG. 6 is a diagram for explaining how the significance paragraph boundaries are determined in the original text analysis routine of FIG. 3.

Also, FIG. 6 is a diagram for explaining how the significance paragraph boundaries are determined in the original text analysis routine of FIG. 3. As shown in FIG. 6, when the sentence of concern starts with a conjunction or the like (such as "incidentally" ("tokorode" in Japanese)) that expresses a change of a topic in the original text, the conjunction is likely to be considered the boundary between the significance paragraphs. Also, when the sentence of concern starts with a conjunction or the like (such as "thus" ("konoyohni" in Japanese)) that express a continuation of a topic in the original text, the conjunction is likely to be considered as being within the significance paragraph (or the non-boundary in the significance paragraph).

Figure 7:
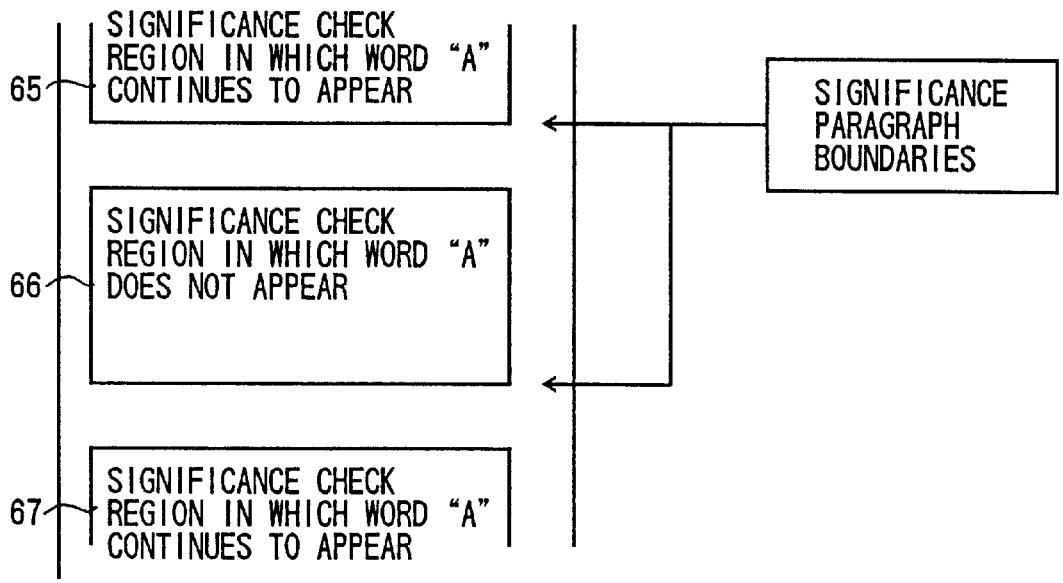
FIG. 7 is a diagram for explaining how the significance paragraph boundaries are determined in the original text analysis routine of FIG. 3.

Also, FIG. 7 is a diagram for explaining how the significance paragraph boundaries are determined in the original text analysis routine of FIG. 3. As shown in FIG. 7, it is supposed that a significant word "A" for the whole original text continues to appear in sentences of a first significance check region 65, the significant word "A" does not appear in sentences of a second significance check region 66, and the significant word "A" continues to appear in sentences of a third significance check region 67. In the example of FIG. 7, the end of the significance check region 65 in which such sentences that include the significant word "A" are contained is likely to be considered the boundary between the significance paragraphs, and the start of the significance check region 67 in which such sentences that include the significant word "A" are contained is likely to be considered the boundary between the significance paragraphs.

Figure 8:
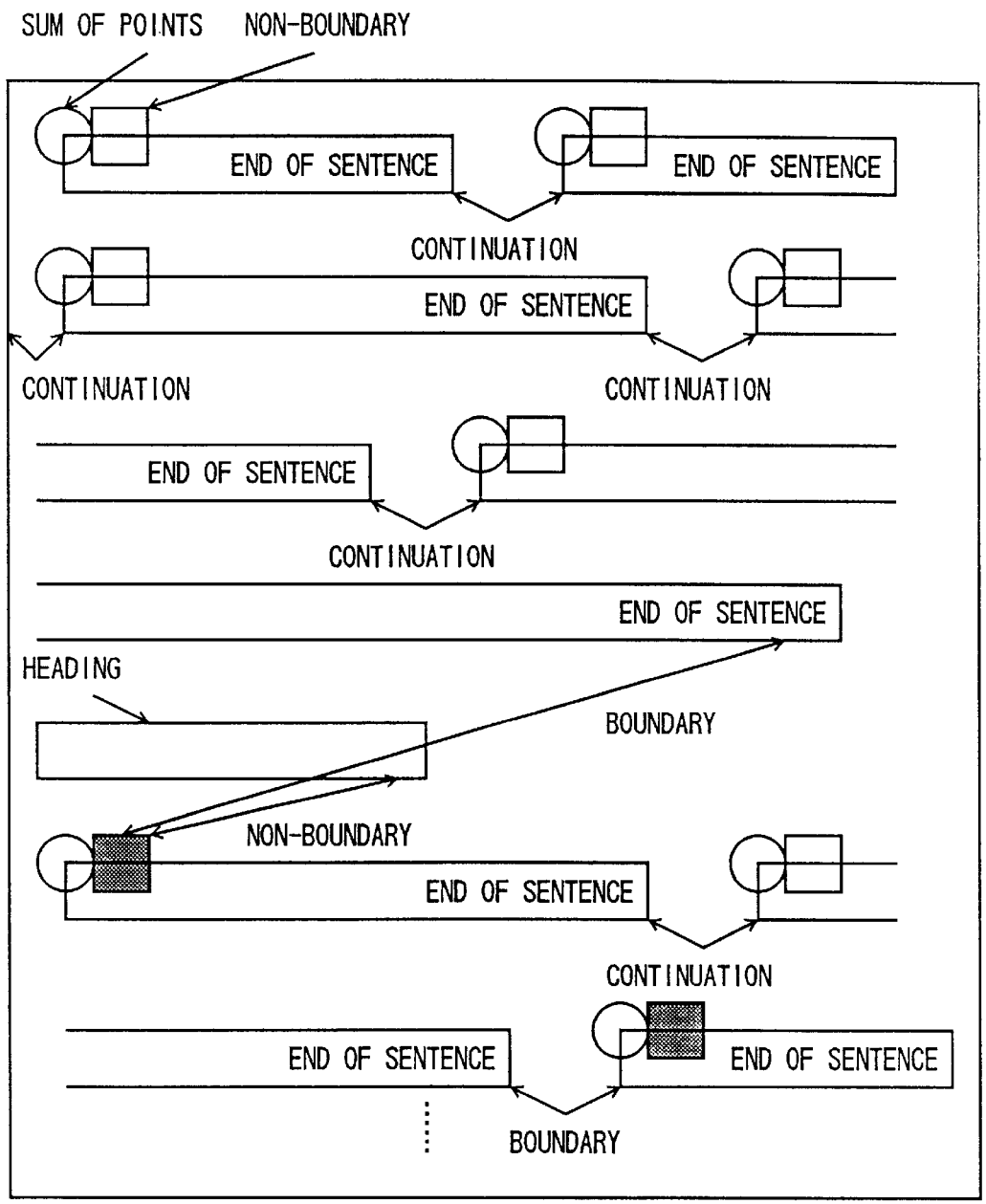
FIG. 8 is a diagram for explaining calculation and storing of a sum of points rated for each sentence in the original text analysis routine of FIG. 3.

FIG. 8 is a diagram for explaining calculation and storing of a sum of points rated for each of the individual sentences in the original text, which is carried out in the original text analysis routine of FIG. 3.

In FIG. 8, the white circle at the start of each sentence indicates a sum of points rated for the sentence of concern, the white rectangle at the start of each sentence indicates a continuation of a topic at the position between the end of the preceding sentence and the start of the sentence, and the black rectangle indicates a significance paragraph boundary at the position between the end of the preceding sentence and the start of the sentence. Only when a title or a heading is preceded by the sentence, the black rectangle attached to the start of the sentence indicates a significance paragraph boundary at the position between the end of the preceding sentence prior to the title or the heading and the start of the sentence.

Figure 9:
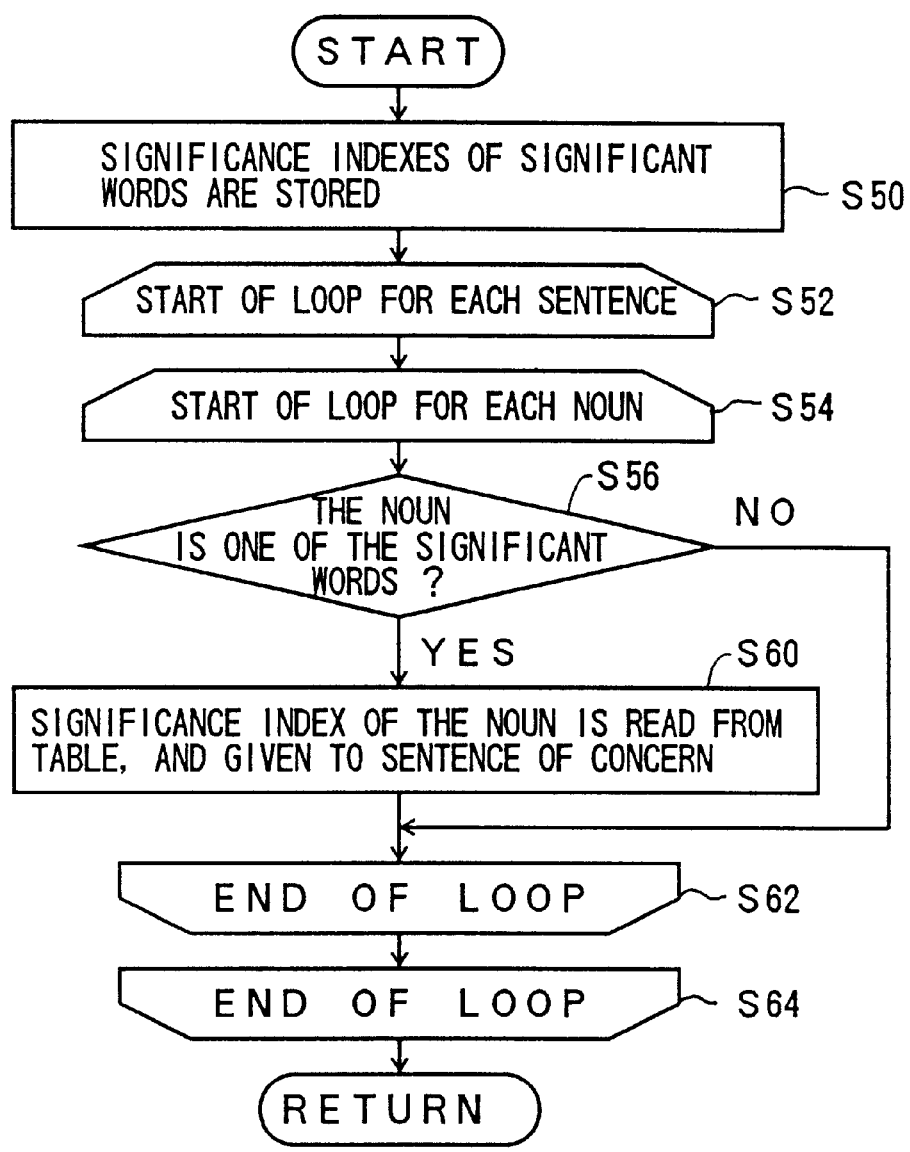
FIG. 9 is a flowchart for explaining a first part of a summarized text generating routine in the document comprehension support processing of FIG. 2.

FIG. 9 is a flowchart for explaining a first part of a summarized text generating routine in the document comprehension support processing of FIG. 2. The summarized text generating routine of FIG. 9 is carried out with respect to each of the significance paragraphs in the original text. As described above, in the original text analysis routine of FIG. 3, the boundaries between the significance paragraphs are determined based on respective sums of points rated for the individual sentences in the original text.

As shown in FIG. 9, at the start of the summarized text generating routine, the CPU 10 at step S50 stores significance indexes of both the significant words (or nouns) for the whole original text and the significant words (or nouns) for the significance paragraph of concern in a significance index table of the memory device 30. Hence, the noun, the significance index of which is stored in the significance index table of the memory device 30, is considered one of the significant words.

The CPU 10 at step S52 starts a loop processing in which a calculation of the significance index for the sentence of concern is repeated with respect to each of the individual sentences in the original text.

The CPU 10 at step S54 starts a loop process in which a reading of the significance index for the noun of concern is repeated with respect to each of the individual nouns in the sentence of concern.

The CPU 10 at step S56 determines whether the noun of concern is one of the significant words. As described above, when the significance index of the noun is stored in the significance index table of the memory device 30, it is determined at this step S56 that the noun is one of the significant words.

When the result at the step S56 is affirmative, the CPU 10 at step S60 reads the significance index of the noun from the significance index table of the memory device 30, and gives the read significance index to the sentence of concern.

When the result at the step S56 is negative, the control of the CPU 10 is transferred to step S62 (which will be described below), and the step S60 is not performed.

The CPU 10 at step S62 detects that the loop of the step S54 for each of the individual nouns in the sentence of concern is terminated. Only when the loop for all the nouns in the sentence is not terminated, the control of the CPU 10 is transferred to the step S56 to process the next noun.

After the step S62 is performed, the CPU 10 at step S64 detects that the loop of the step S52 for each of the individual sentences in the original text is terminated. Only when the loop for all the sentences in the original text is not terminated, the control of the CPU 10 is transferred to the step S54 to process the next sentence.

After the step S64 is performed, the first part of the summarized text generating routine shown in FIG. 9 ends.

Figure 10:
FIG. 10 is a diagram for explaining calculation of sums of significance indexes for the individual sentences when the summarized text generating routine of FIG. 9 is carried out.

FIG. 10 is a diagram for explaining calculation of sums of significance indexes for the individual sentences when the summarized text generating routine of FIG. 9 is carried out.

As shown in FIG. 10, a significance index sum table 70 is produced in the memory device 30 when the summarized text generating routine of FIG. 9 is carried out. In the significance index sum table 70, the sentence numbers that identify the individual sentences in the original text are listed at a first column, all the nouns included in each of the individual sentences are listed at a second column, and the sums of the significance indexes for the individual sentences are listed at a third column. In the second column of this table, the non-significant nouns included in the sentence of concern are indicated by lower-case alphabetic characters (a, b, c, ... ), and the significant nouns included in the sentence of concern are indicated by upper-case alphabetic characters (A, B, C ... ). A sum of the significance indexes for the sentence of concern is calculated as a total of the significance indexes of the significant nouns (which are respectively read from the significant index table).

In the example of FIG. 10, the sum of the significance indexes for the sentence#3 is calculated as a total of the significance indexes of the significant nouns "D", "B", "D" and "D". That is, the sum of the significance indexes for the sentence#3 is equal to 30 (=8+6+8+8).

Figure 11:
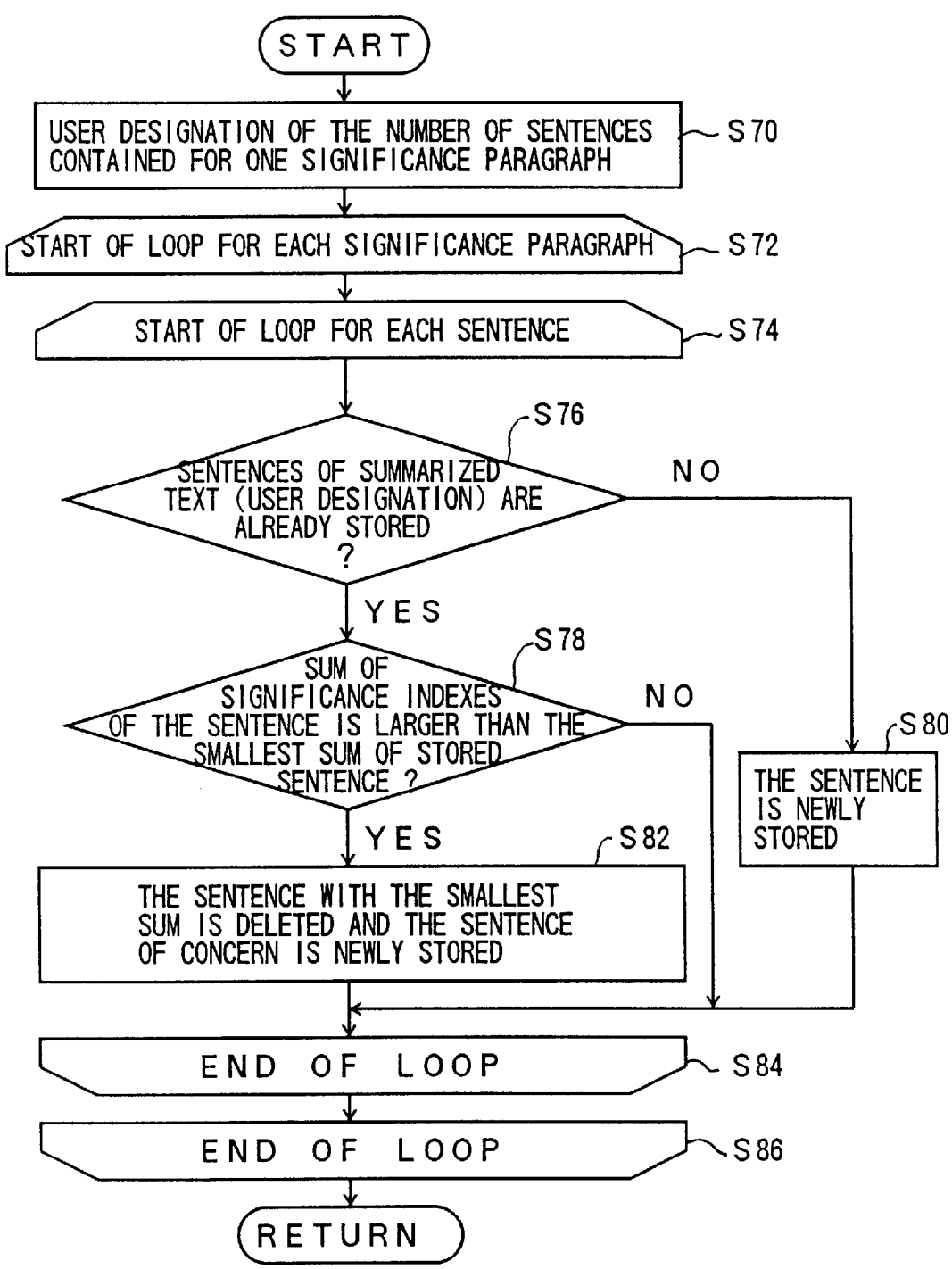
FIG. 11 is a flowchart for explaining a second part of the summarized text generating routine.

FIG. 11 is a flowchart for explaining a second part of the summarized text generating routine. The summarized text generating routine of FIG. 11 is carried out after the summarized text generating routine of FIG. 9 is carried out. As described above, in the summarized text generating routine of FIG. 9, a sum of significance indexes for each of the individual sentences contained in the significance paragraphs of the original text is calculated.

As shown in FIG. 11, at the start of the second part of the summarized text generating routine, the CPU 10 at step S70 requests the user to designate the number of sentences which should be contained in the summarized text for one of the significance paragraphs, by using the input device 20. In the step S70, the CPU 10 receives the user's designation number of sentences.

After the step S70 is performed, the CPU 10 at step S72 starts a loop processing in which a generation of the summarized text is repeated for each of the significance paragraphs in the original text.

The CPU 10 at step S74 starts a loop processing in which a generation of the summarized text is repeated for each of the individual sentences in the significance paragraph of concern.

The CPU 10 at step S76 determines whether the sentences of the summarized text (the number of which is equal to the user's designation number) are already stored in a summarized text region of the memory device 30.

Suppose that a summarized text region is prepared in the memory device 30 for each of the significance paragraphs of the original text, and in each summarized text region, link information of the summarized text (for example, a document file name and a document file address) related to the corresponding significance paragraph is also stored together with the sentences of the summarized text.

When the result at the step S76 is negative, the CPU 10 at step S80 newly stores the sentence of concern (which is taken from the significance paragraph of concern in a sequential manner), into the summarized text region of the memory device 30. After the step S80 is performed, the CPU 10 proceeds to step S84 (which will be described below).

When the result at the step S76 is affirmative, the CPU 10 at step S78 determines whether the sum of significance indexes of the sentence of concern is larger than the smallest one among the sums of significance indexes of the sentences stored in the summarized text region.

When the result at the step S78 is negative, the CPU 10 proceeds to the step S84 (which will be described below). When the result at the step S78 is affirmative, the CPU 10 at step S82 deletes the sentence with the smallest sum of significance index in the summarized text region and newly stores the sentence of concern into the summarized text region. After the step S82 is performed, the CPU 10 proceeds to the step S84 (which will be described below).

The CPU 10 at the step S84 detects that the loop of the step S74 for each of the sentences in the significance paragraph is terminated. Only when the loop for all the sentences in the significance paragraph is not terminated, the control of the CPU 10 is transferred to the step S76 to process the next sentence.

After the step S84 is performed, the CPU 10 at step S86 detects that the loop of the step S72 for each of the significance paragraphs in the original text is terminated. Only when the loop for all the significance paragraphs in the original text is not terminated, the control of the CPU 10 is transferred to the step S74 to process the next significance paragraph.

After the step S86 is performed, the second part of the summarized text generating routine shown in FIG. 11 ends.

Hence, when the summarized text generating routine of FIG. 11 is carried out, a summarized text is generated from each of the significance paragraphs, the summarized text containing only a predetermined number of sentences selected in decreasing order of the calculated sum of significance indexes.

Figure 12:
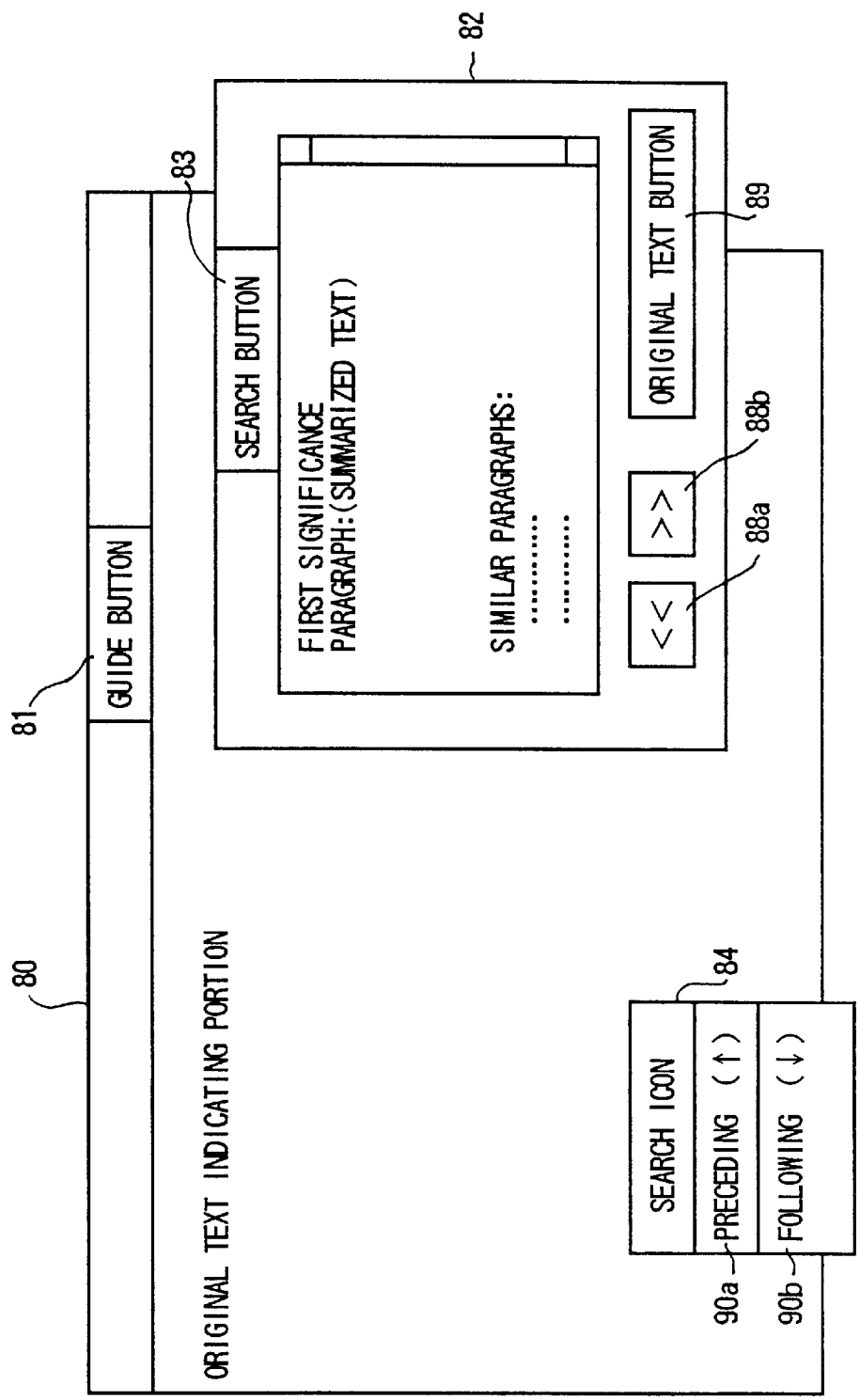
FIG. 12 is a diagram showing an indication of a guide of the original text displayed in the document comprehension support processing of FIG. 2.

Next, FIG. 12 shows an indication of a guide of the original text displayed in the step S16 of the document comprehension support processing of FIG. 2. In the document comprehension support apparatus of the present embodiment, the guide of the original text is displayed on the display device 40 when the step S16 is performed.

As shown in FIG. 12, an original text window 80 and a summarized text window 82 are indicated on the display device 40 when the step S16 is performed. The original text window 80 includes an original text indicating portion in which the original text is displayed, and includes a guide button 81. The summarized text window 82 includes a summarized text indicating portion in which the summarized text is displayed as a guide of the original text for the user, and includes a search button 83. Further, a search icon 84 is indicated in an overlapping manner with the original text window 80.

In the step S16 of the document comprehension support processing of FIG. 2, an indication of a first significance paragraph of the original text initially appears in the original text indicating portion of the original text window 80. After this, when the guide button 81 is clicked with the mouse 22, an indication of a summarized text corresponding to the first significance paragraph appears in the summarized text indicating portion of the summarized text window 82. Further, when the search button 83 is clicked with the mouse 22, the search icon 84 is displayed in an overlapping manner with the original text window 80, and when the search button 83 is clicked once again, the search icon 84 is eliminated.

Figure 13:
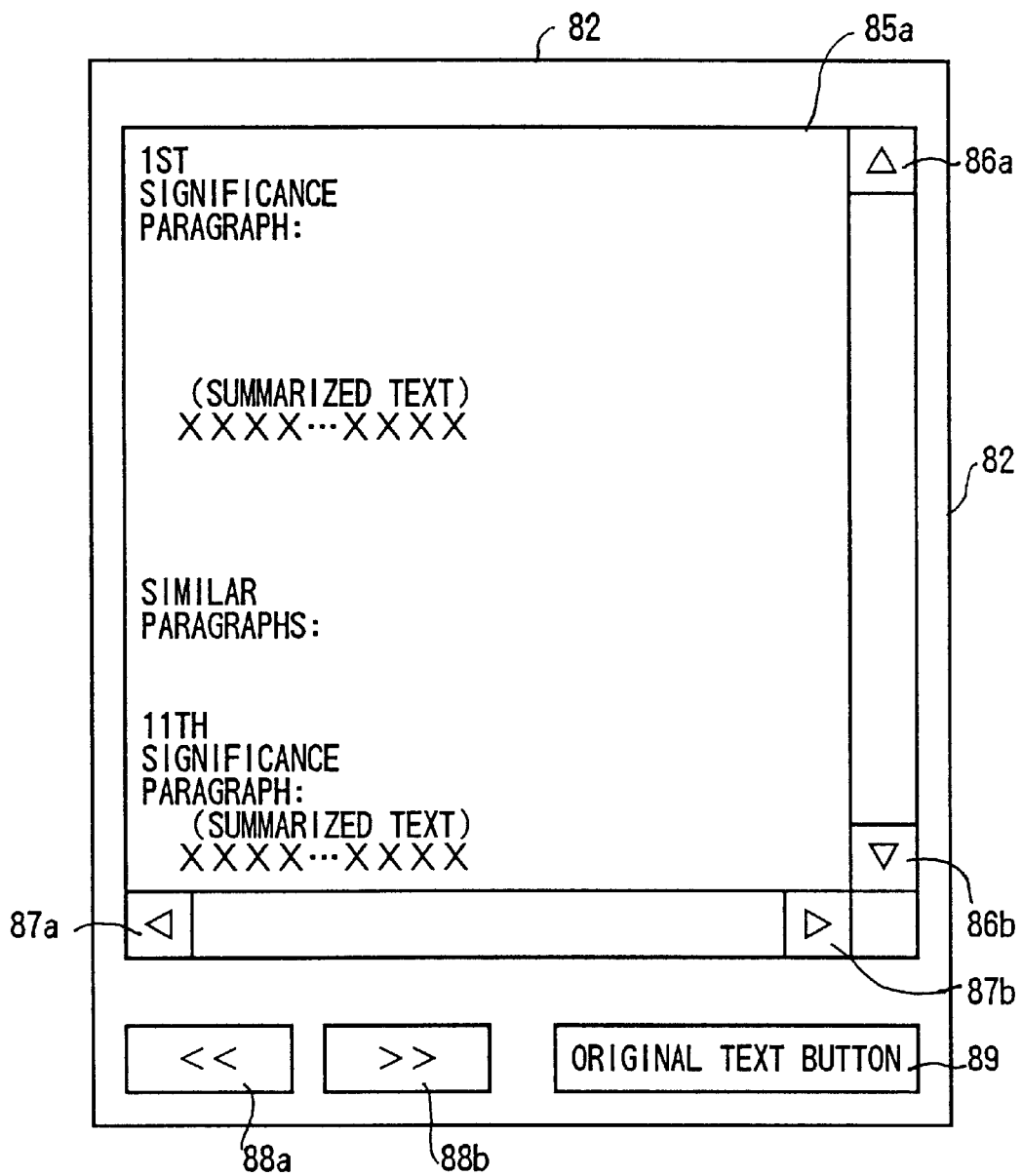
FIG. 13 is a diagram showing an indication of a summarized text window in the guide of the original text of FIG. 12.

FIG. 13 shows an indication of the summarized text window 82 in the guide of the original text of FIG. 12.

As shown in FIG. 13, the summarized text window 82 includes a summarized text indicating portion 85. In the summarized text indicating portion 85 of the summarized text window 82, a summarized text of a designated significance paragraph (initially the first significance paragraph) and a summarized text of similar paragraphs related to the designated significance paragraph are displayed. In the present embodiment, the similar paragraphs are some of the significance paragraphs of the original text, which contain significant words (the number of which is above a given reference number) identical to the significant words contained in the designated significance paragraph. When two or more similar paragraphs exist in the original text, the similar paragraph including the largest number of significant words identical to those contained in the designated significance paragraph is selected and the summarized text of the similar paragraph is displayed in the summarized text indicating portion 85.

The summarized text window 82 includes an upper arrow button 86a and a lower arrow button 86b. When one of the upper and lower arrow buttons 86a and 86b is clicked with the mouse 22, the summarized text in the summarized text indicating portion 85 is scrolled in an up/down vertical direction. Also, the summarized text window 82 includes a left arrow button 87a and a right arrow button 87b. When one of the left and right arrow buttons 87a and 87b is clicked with the mouse 22, the summarized text in the summarized text indicating portion 85 is scrolled in a left/right horizontal direction.

Further, as shown in FIG. 13, the summarized text window 82 includes a preceding paragraph button ("<<") 88a, a following paragraph button (">>") 88b, and an original text button 89.

Figure 14A:
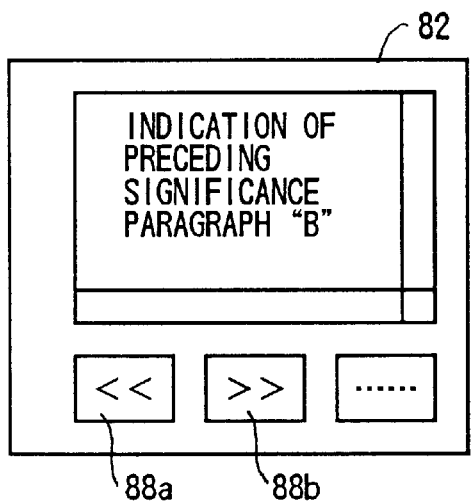
FIG. 14A, FIG. 14B and FIG. 14C are diagrams for explaining a scrolling of a summarized text indicating portion of FIG. 13 when a preceding paragraph button or a following paragraph button is clicked with a mouse.
Figure 14C:
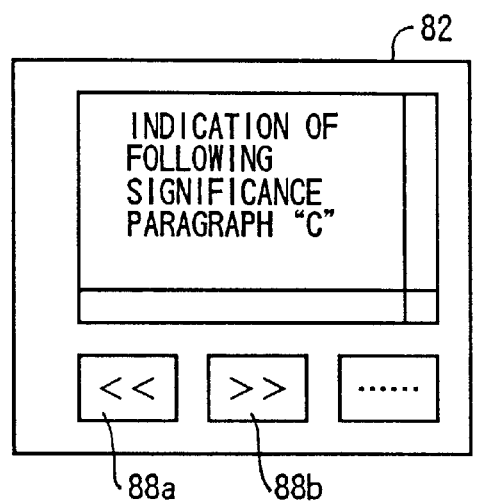
Figure 14B:
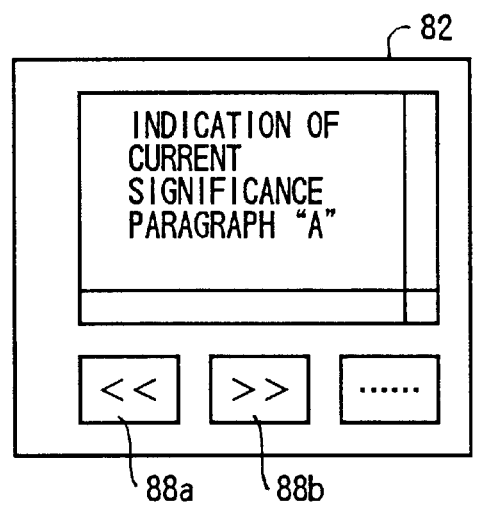

FIG. 14A, FIG. 14B and FIG. 14C are diagrams for explaining a paragraph designation of the summarized text indicating portion 85 of FIG. 13 when the preceding paragraph button 88a or the following paragraph button 88b is clicked with the mouse 22.

Suppose that a summarized text of a significance paragraph "A" is currently indicated in the summarized text indicating portion 85 as the designated significance paragraph (see FIG. 14B). When the preceding paragraph button 88a is clicked with the mouse 22 during the indication of FIG. 14B, the indication of the designated significance paragraph is shifted to a summarized text of a preceding significance paragraph "B" (which precedes the significance paragraph "A" in the original text) as shown in FIG. 14A. On the other hand, when the following paragraph button 88b is clicked with the mouse 22 during the indication of FIG. 14B, the indication of the designated significance paragraph is shifted to a summarized text of a following significance paragraph "C" (which follows the significance paragraph "A" in the original text) as shown in FIG. 14C.

Figure 15:
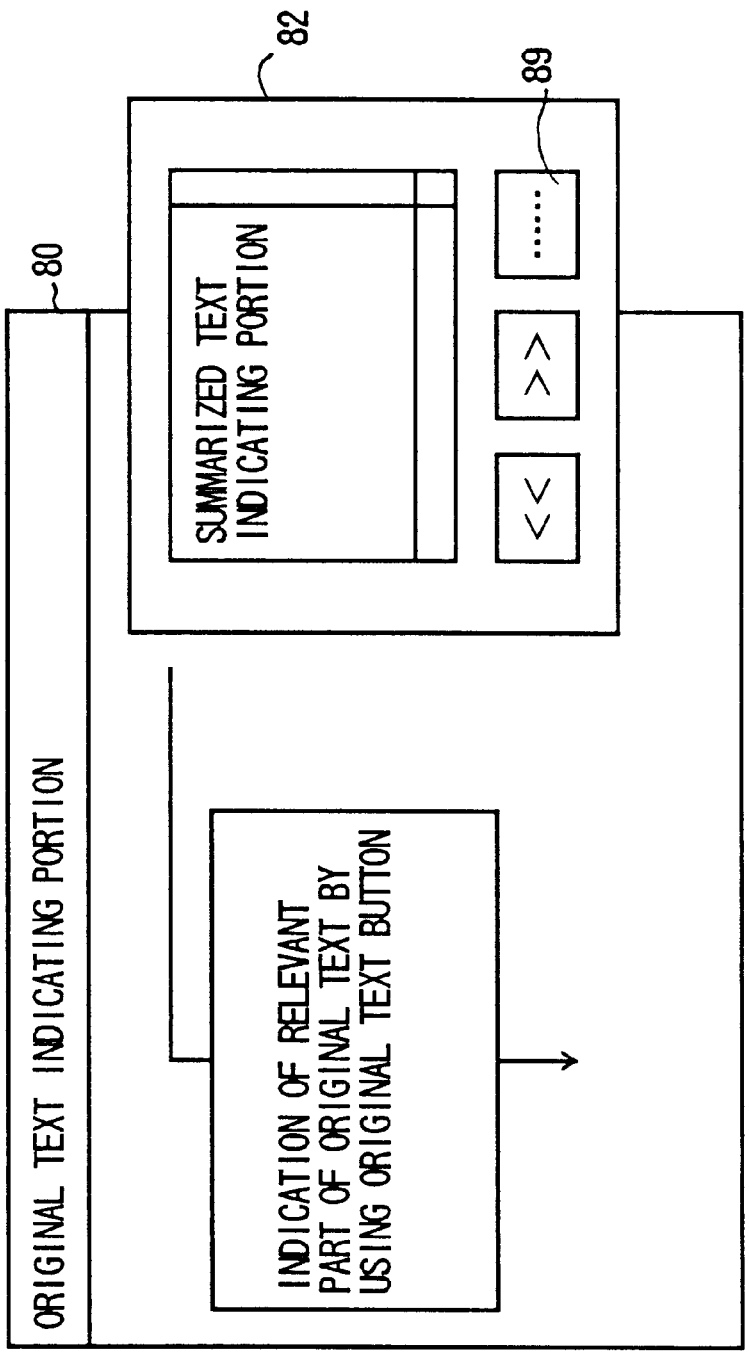
FIG. 15 is a diagram showing an indication of a relevant part of the original text in an original text window when an original text button is clicked with the mouse.

FIG. 15 shows an indication of a relevant part of the original text in the original text window 80 when the original text button 89 is clicked with the mouse 22.

As shown in FIG. 15, suppose that a summarized text of a designated significance paragraph is currently indicated in the summarized text indicating portion 85 of the summarized text window 82. When the original text button 89 is clicked in this condition, a relevant part of the original text (corresponding to the designated significance paragraph in the summarized text window 82) is displayed in the original text indicating portion of the original text window 80. Hence, the document comprehension support apparatus of the present embodiment enables the user to access the relevant part of the original text while the summarized text of the designated significance paragraph is displayed.

As described above, when the search button 83 is clicked with the mouse 22, the search icon 84 is displayed in an overlapping manner with the original text window 80. The search icon 84 includes a preceding text button 90a and a following text button 90b.

Figure 16:
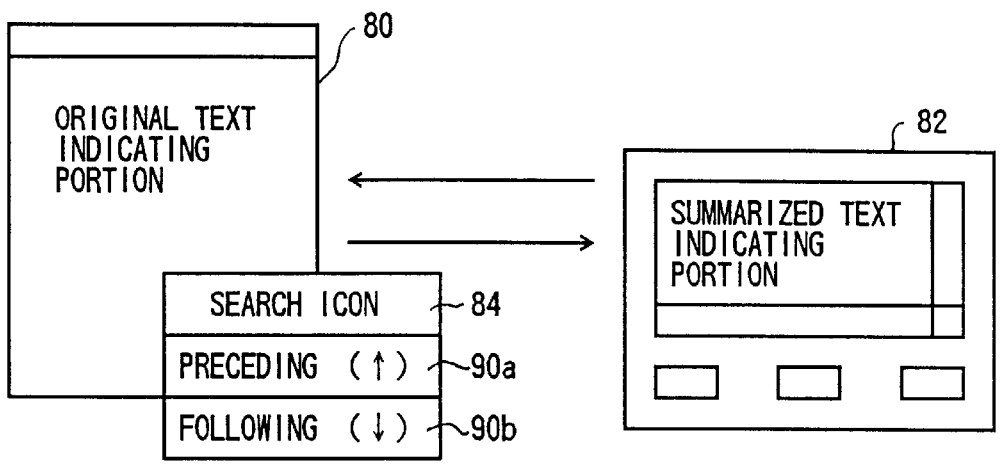
FIG. 16 is a diagram showing an indication of a relevant part of the original text in the original text window by using a search icon to scroll the original text in the original text window.

FIG. 16 shows an indication of a relevant part of the original text in the original text window 80 by using the search icon 84 to scroll the original text in the original text window 80.

Suppose that the original text is displayed in the original text indicating portion of the original text window 80 with a summarized text of a designated significance paragraph being displayed in the summarized text indicating portion of the summarized text window 82. If the search button 83 is clicked in this condition, then the search icon 84 is displayed as shown in FIG. 16.

When the preceding text button 90a of the search icon 84 is clicked with the mouse 22, the original text in the original text window 80 is scrolled to a preceding part of the original text. When the following text button 90b is clicked with the mouse 22, the original text in the original text window 80 is scrolled to a following part of the original text. Hence, the user can search for a desired part of the original text by using the search icon 84 to scroll the original text in the original text window 80.

FIG. 17 is a flowchart for explaining an operational procedure when the user searches for a desired part of the original text in the original text window 80 or a desired part of the summarized text in the summarized text window 82.

Suppose that, prior to the start of the operational procedure of FIG. 17, the original text is displayed in the original text indicating portion of the original text window 80 with a summarized text of a designated significance paragraph being displayed in the summarized text indicating portion of the summarized text window 82.

As shown in FIG. 17, the user at step S100 determines whether the display of a summarized text of a preceding significance paragraph (which precedes the designated significance paragraph) in the summarized text window 82 is needed. When the result at the step S100 is affirmative, the user at step S102 clicks the preceding paragraph button 88a. Otherwise the user proceeds to a subsequent step.

The user at step S104 determines whether the display of a summarized text of a following significance paragraph (which follows the designated significance paragraph) in the summarized text window 82 is needed. When the result at the step S104 is affirmative, the user at step S106 clicks the following paragraph button 88b. Otherwise the user proceeds to a subsequent step.

The user at step S108 determines whether the display of a relevant part of the original text, corresponding to the designated significance paragraph (which is currently displayed in the summarized text window 82), in the original text window 80 is needed. When the result at the step S108 is affirmative, the user at step S110 clicks the original text button 89. Otherwise the user proceeds to a subsequent step.

The user at step S112 determines whether the display of a relevant part of the original text, corresponding to a similar paragraph related to the designated significance paragraph currently displayed, in the original text window 80 is needed. When the result at the step S112 is affirmative, the user at step S114 scrolls the summarized text of the similar paragraph to a desired part and clicks the original text button 89. Otherwise the user proceeds to a subsequent step.

The user at step S116 determines whether the display of a relevant part of the original text, corresponding to a preceding significance paragraph (which precedes the designated significance paragraph currently displayed), in the original text window 80 is needed. When the result at the step S116 is affirmative, the user at step S118 displays the search icon 84 by clicking the search button 83, and clicks the preceding text button 90a. Otherwise the user proceeds to a subsequent step.

The user at step S120 determines whether the display of a relevant part of the original text, corresponding to a following significance paragraph (which follows the designated significance paragraph currently displayed), in the original text window 80 is needed. When the result at the step S120 is affirmative, the user at step S122 displays the search icon 84 by clicking the search button 83, and clicks the following text button 90b. Otherwise the operational procedure of FIG. 17 ends.

As described above, in the document comprehension support apparatus of the present embodiment, the original text is divided into significance paragraphs by the CPU 10, the significance paragraphs being separated from each other at boundaries that are determined based on sums of points rated for individual sentences in the original text, each significance paragraph containing a group of sentences. A sum of significance indexes is calculated for each of the individual sentences contained in the significance paragraphs produced. A summarized text is generated from each significance paragraph by the CPU 10, the summarized text containing only a predetermined number of sentences selected in order of the calculated sum of significance indexes. The sentences of a summarized text generated from each significance paragraph are stored in a corresponding summarized text region of the memory device 30. The summarized text thus generated is displayed on the display device 40 in accordance with the user's designation of one of the significance paragraphs.

Accordingly, it is possible to possible that the document comprehension support apparatus of the above-described embodiment be constructed in a simple structure with a small system size. The document comprehension support apparatus of the above-described embodiment does not require the sentence structure analysis and a large amount of statistical indexes as in the previously described conventional apparatus and method, and it requires only a short processing time to generate the summarized text from the original text. It is possible for the apparatus and method of the above-described embodiment to provide an effective, easy-to-use tool for the user in searching for a desired part of not only the summarized text but also the original text.

In the above-described embodiment, the CPU 10 acts as an original text analysis unit in the claims when performing the step S12 (or the routine of FIG. 3) of the document comprehension support processing of FIG. 2. The CPU 10 acts as a summarized text generating unit in the claims when performing the step S14 (or the routines of FIG. 9 and FIG. 11) of the document comprehension support processing of FIG. 2. The CPU 10 acts as a summarized text display unit in the claims when performing the step S16 of the document comprehension support processing of FIG. 2.

Further, the present invention is not limited to the above-described embodiment, and variations and modifications may be made without departing from the scope of the present invention.

The present invention is based on Japanese patent application No. 10-63245, filed on Mar. 13, 1998, the entire contents of which are hereby incorporated by reference.

What is claimed is:

1. A document comprehension support apparatus comprising:
   an original text analysis unit dividing an original text into significance paragraphs, the significance paragraphs being separated from each other at boundaries that are determined based on sums of points rated for individual sentences in the original text, each significance paragraph containing a group of sentences; and
   a summarized text generating unit calculating a sum of significance indexes for each of the individual sentences contained in the significance paragraphs produced by the original text analysis unit, and generating a summarized text from each of the significance paragraphs, the summarized text containing only a predetermined number of sentences selected in order of the calculated sum of significance indexes.

2. The apparatus according to claim 1, further comprising a summarized text display unit causing the summarized text, generated by the summarized text generating unit, to be displayed on a display device.

3. The apparatus according to claim 2, wherein the summarized text display unit causes a relevant part of the original text, corresponding to the summarized text, to be displayed on a first window of the display device, and causes the summarized text to be displayed on a second window of the display device.

4. The apparatus according to claim 2, wherein the summarized text display unit causes both a summarized text of a designated one of the significance paragraphs and a summarized text of a similar paragraph related to the designated significance paragraph to be displayed on the display device.

5. The apparatus according to claim 1, wherein the original text analysis unit comprises:
- a point rating unit determining the points rated for each sentence contained in one of significance check regions of the original text based on predetermines rules; and
- a boundary determining unit determining a start of one of said sentences as being a boundary between the significance paragraphs when said one of said sentences has a sum of the points, determined by said point rating unit, which exceeds a given threshold value.

6. The apparatus according to claim 5, wherein the boundary determining unit determines a start of one of said sentences as a boundary between the significance paragraphs when a significant word for the whole original text continues to appear in a preceding significance check region and does not appear in other significance check regions.

7. The apparatus according to claim 5, wherein the boundary determining unit determines a start of one of said sentences as being a boundary between the significance paragraphs when the original text is divided into plural document files and said one of said sentences is preceded by an end of one of the plural document files.

8. The apparatus according to claim 5, wherein the boundary determining unit determines a start of one of said sentences as being a boundary between the significance paragraphs when a preceding one of said sentences is followed by a title or a heading of the original text.

9. The apparatus according to claim 5, wherein the boundary determining unit determines a start of one of said sentences as being a boundary between the significance paragraphs when said one of said sentences starts with a conjunction or another word that expresses a change of a topic in the original text.

10. A computer readable medium storing program code for causing a processor to execute a document comprehension support processing, comprising:
- a first program code unit for causing the processor to divide an original text into significance paragraphs, the significance paragraphs being separated from each other at boundaries that are determined based on sums of points rated for individual sentences in the original text, each significance paragraph containing a group of sentences;
- a second program code unit for causing the processor to calculate a sum of significance indexes for each of the individual sentences contained in the significance paragraphs produced by the first program code unit; and
- a third program code unit for causing the processor to generate a summarized text from each of the significance paragraphs, the summarized text containing only a predetermined number of sentences selected in order of the calculated sum of significance indexes.

11. The computer readable medium according to claim 10, further comprising a fourth program code unit or causing the processor to display the summarized text, generated by the third program code unit, on a display device.

12. The computer readable medium according to claim 11, wherein said fourth program code unit causes the processor to display a relevant part of the original text, corresponding to the summarized text, on a first window of the display device, and display the summarized text on a second window of the display device.

13. A method of generating a summarized text from an original text, comprising:
- dividing an original text into significance paragraphs, the significance paragraphs being separated from each other at boundaries that are determined based on sums of points rated for individual sentences in the original text, each significance paragraph containing a group of sentences;
- calculating a sum of significance indexes for each of the individual sentences contained in the significance paragraphs; and
- generating a summarized text from each of the significance paragraphs, the summarized text containing only a predetermined number of sentences selected in order of the calculated sum of significance indexes.

14. The method according to claim 13, wherein dividing of the original text comprises:
- determining points rated for each sentence in one of significance check regions of the original text based on predetermines rules; and
- determining a start of one of said sentences as being a boundary between the significance paragraphs when said one of said sentences has a sum of the points which exceeds a given threshold value.

15. The method according to claim 14, wherein determination of the boundary comprises determining a start of one of said sentences as being a boundary between the significance paragraphs when a significant word for the whole original text continues to appear in a preceding significance check region and does not appear in other significance check regions.

16. The method according to claim 14, wherein the second determining step determines a start of one of said sentences as being a boundary between the significance paragraphs when the original text is divided into plural document files and said one of said sentences is preceded by an end of one of the plural document files.

17. The method according to claim 14, wherein the second determining step determines a start of one of said sentences as being a boundary between the significance paragraphs when a preceding one of said sentences is followed by a title or a heading of the original text.

18. The method according to claim 14, wherein the second determining step determines a start of one of said sentences as being a boundary between the significance paragraphs when said one of said sentences starts with a conjunction or another word that expresses a change of a topic in the original text.

* * * * *